US009348009B2

(12) United States Patent  (10) Patent No.: US 9,348,009 B2
Sontag  (45) Date of Patent: May 24, 2016

(54) ELECTROMAGNETIC EMITTER EMITTING SIMULTANEOUSLY ALONG THREE ORTHOGONAL AXES TO DETECT OBJECT POSITION AND ORIENTATION

(75) Inventor: Yves Sontag, Bordeaux (FR)

(73) Assignee: Thales, Courbevoie (FR)

( * ) Notice: Subject to any disclaimer, the term of this patent is extended or adjusted under 35 U.S.C. 154(b) by 1122 days.

(21) Appl. No.: 13/408,827

(22) Filed: Feb. 29, 2012

(65) Prior Publication Data

US 2012/0223856 A1 Sep. 6, 2012

(30) Foreign Application Priority Data

Mar. 3, 2011 (FR) ...................................... 11 00642

(51) Int. Cl.
| | |
|---|---|
| G01S 13/06 | (2006.01) |
| G01S 1/14 | (2006.01) |
| F41G 3/22 | (2006.01) |
| G01S 1/02 | (2010.01) |
| G01S 3/02 | (2006.01) |
| G01S 5/02 | (2010.01) |

(52) U.S. Cl.
CPC . *G01S 1/14* (2013.01); *F41G 3/225* (2013.01); *G01S 1/022* (2013.01); *G01S 3/023* (2013.01); *G01S 5/0247* (2013.01)

(58) Field of Classification Search
None
See application file for complete search history.

(56) References Cited

U.S. PATENT DOCUMENTS

| | | | | | |
|---|---|---|---|---|---|
| 3,354,459 | A | * | 11/1967 | Schwartz | H01Q 21/245 342/362 |
| 3,868,565 | A | * | 2/1975 | Kuipers | F41G 7/00 318/16 |

(Continued)

FOREIGN PATENT DOCUMENTS

| | | |
|---|---|---|
| FR | 2685491 A1 | 6/1993 |
| FR | 2807831 A1 | 10/2001 |

(Continued)

*Primary Examiner* — Jermele M Hollington
*Assistant Examiner* — Suresh K Rajaputra
(74) *Attorney, Agent, or Firm* — Baker & Hostetler LLP

(57) ABSTRACT

An electromagnetic emission device for helmet position detection systems includes an electromagnetic emitter and control electronics, the emitter comprising three windings arranged perpendicularly, the processing electronics comprising three electronic chains each associated to a given winding and working simultaneously. Each electronic chain comprises closed-loop control means arranged such that the related signal generated comprises three analogue components: a first component, being the stimulus component, modulated at an "emission" frequency of the winding, each of the three emission frequencies being different from one winding to the next, and a second and a third component, referred to as correction components, modulated at an emission frequency of another winding, the phase and amplitude of which are calculated such as to compensate the parasitic signals received by said winding from the other two windings. Each winding in steady-state only emits electromagnetic radiation at its own emission frequency and at a predetermined phase and intensity.

9 Claims, 8 Drawing Sheets

(56) References Cited

U.S. PATENT DOCUMENTS

| | | | | |
|---|---|---|---|---|
| 3,983,474 A * | 9/1976 | Kuipers | G01S 13/422 | 318/16 |
| 4,017,858 A * | 4/1977 | Kuipers | F41G 7/00 | 318/653 |
| 4,111,555 A * | 9/1978 | Ellis | F41G 3/225 | 356/139.03 |
| 4,197,855 A * | 4/1980 | Lewin | A61C 19/045 | 338/32 H |
| 4,298,874 A * | 11/1981 | Kuipers | G01S 1/42 | 342/386 |
| 4,314,251 A * | 2/1982 | Raab | G01S 3/14 | 324/207.24 |
| 4,737,794 A * | 4/1988 | Jones | F41G 3/225 | 342/386 |
| 4,742,356 A * | 5/1988 | Kuipers | F41G 3/225 | 342/386 |
| 4,792,697 A * | 12/1988 | Le Parquier | F41G 3/225 | 250/559.3 |
| 4,866,260 A * | 9/1989 | Lescourret | G01R 33/3621 | 324/76.28 |
| 4,920,317 A * | 4/1990 | Lescourret | G01R 33/24 | 324/318 |
| 4,945,305 A * | 7/1990 | Blood | F41G 3/225 | 324/207.11 |
| 5,039,035 A * | 8/1991 | Fitzpatrick | A42B 3/0473 | 128/857 |
| 5,093,567 A * | 3/1992 | Staveley | A42B 3/042 | 250/221 |
| 5,128,794 A * | 7/1992 | Mocker | G01S 17/06 | 340/980 |
| 5,168,222 A * | 12/1992 | Volsin | F41G 3/225 | 324/207.12 |
| 5,172,056 A * | 12/1992 | Voisin | F41G 3/225 | 324/207.17 |
| 5,307,072 A * | 4/1994 | Jones, Jr. | F41G 3/08 | 324/244 |
| 5,347,289 A * | 9/1994 | Elhardt | G01S 5/0247 | 342/448 |
| 5,424,556 A * | 6/1995 | Symosek | G01S 17/875 | 250/203.2 |
| 5,453,686 A * | 9/1995 | Anderson | G01S 5/0247 | 324/207.17 |
| 5,495,129 A * | 2/1996 | Schou | G01V 3/104 | 307/104 |
| 5,646,525 A * | 7/1997 | Gilboa | F41G 3/225 | 324/207.17 |
| 5,694,041 A * | 12/1997 | Lescourret | G02B 27/017 | 324/207.12 |
| 5,767,669 A * | 6/1998 | Hansen | G01B 7/004 | 324/207.12 |
| 5,847,976 A * | 12/1998 | Lescourret | G01S 1/022 | 324/207.13 |
| 6,054,951 A * | 4/2000 | Sypniewski | G01S 5/06 | 342/451 |
| 6,172,499 B1 * | 1/2001 | Ashe | F41G 3/225 | 324/207.12 |
| 6,246,231 B1 * | 6/2001 | Ashe | G01B 7/003 | 128/899 |
| 6,316,934 B1 * | 11/2001 | Amorai-Moriya | G01B 7/004 | 324/207.17 |
| 6,377,041 B1 * | 4/2002 | Jones, Jr. | G01V 3/12 | 324/207.12 |
| 6,484,131 B1 * | 11/2002 | Amorai-Moriya | G06T 7/208 | 701/514 |
| 6,487,516 B1 * | 11/2002 | Amorai-Moriya | G06K 9/00342 | 324/207.17 |
| 6,528,991 B2 * | 3/2003 | Ashe | A61B 5/06 | 324/207.17 |
| 6,549,004 B1 * | 4/2003 | Prigge | G01S 5/00 | 324/207.17 |
| 6,691,074 B1 * | 2/2004 | Moriya | G06T 7/208 | 702/190 |
| 6,735,263 B1 * | 5/2004 | Moriya | G01S 3/043 | 375/326 |
| 6,754,609 B2 * | 6/2004 | Lescourret | G01B 7/004 | 324/207.12 |
| 6,894,490 B2 * | 5/2005 | Lescourret | G01V 13/00 | 324/202 |
| 6,912,475 B2 * | 6/2005 | Moriya | G06T 7/208 | 702/150 |
| 7,051,636 B1 * | 5/2006 | Snow | F41H 13/0075 | 250/341.1 |
| 7,285,951 B2 * | 10/2007 | Lescourret | F41G 3/225 | 324/207.17 |
| 7,292,948 B2 * | 11/2007 | Jones, Jr. | G01B 7/004 | 702/75 |
| RE40,018 E * | 1/2008 | Palermo | H04J 3/00 | 340/870.31 |
| 7,401,920 B1 * | 7/2008 | Kranz | A61B 3/113 | 351/209 |
| 7,496,871 B2 * | 2/2009 | Suaya | G06F 17/5036 | 703/14 |
| 7,532,160 B1 * | 5/2009 | Zimmerman | G01S 19/11 | 342/357.27 |
| 8,013,595 B2 * | 9/2011 | Jones | A61B 19/5244 | 324/207.17 |
| 8,115,768 B2 * | 2/2012 | Sroka | G06T 7/0026 | 345/427 |
| 8,116,526 B2 * | 2/2012 | Sroka | G06T 7/0026 | 382/103 |
| 8,121,812 B2 * | 2/2012 | Higgins | A61B 5/06 | 324/207.17 |
| 8,259,307 B2 * | 9/2012 | Lacoste | F41G 3/225 | 250/221 |
| 8,339,128 B2 * | 12/2012 | Billeres | A61B 5/06 | 324/228 |
| 8,446,253 B2 * | 5/2013 | Ramchandran | G01S 3/74 | 340/572.1 |
| 8,446,277 B2 * | 5/2013 | Frederick | F16P 3/14 | 340/539.21 |
| 8,450,997 B2 * | 5/2013 | Silverman | G01B 7/004 | 324/207.15 |
| 8,723,509 B2 * | 5/2014 | Patterson, III | G01B 7/004 | 324/202 |
| 8,785,840 B2 * | 7/2014 | Schulte | A01G 15/00 | 250/251 |
| 8,810,390 B2 * | 8/2014 | Frederick | F16P 3/14 | 340/539.21 |
| 2003/0201767 A1 * | 10/2003 | Khalfin | G01S 1/024 | 324/207.17 |
| 2005/0165297 A1 * | 7/2005 | Anderson | A61B 5/06 | 600/410 |
| 2006/0166681 A1 * | 7/2006 | Lohbihler | G01S 5/02 | 455/456.2 |
| 2011/0079703 A1 * | 4/2011 | Gunning, III | F41G 3/225 | 250/206.2 |

FOREIGN PATENT DOCUMENTS

| | | |
|---|---|---|
| FR | 2831258 A1 | 4/2003 |
| WO | 2008/156653 A1 | 12/2008 |

* cited by examiner

ELECTROMAGNETIC EMITTER EMITTING SIMULTANEOUSLY ALONG THREE ORTHOGONAL AXES TO DETECT OBJECT POSITION AND ORIENTATION

CROSS-REFERENCE TO RELATED APPLICATION

This application claims priority to foreign French patent application No. FR 1100642, filed on Mar. 3, 2011, the disclosure of which is incorporated by reference in its entirety.

FIELD OF THE INVENTION

The invention falls within the domain of electromagnetic emitters for position and/or orientation detection systems. These systems are used notably in aeronautics for detecting helmet position, making it possible to control a group of systems as a function of the position of the pilot's head using a closed loop. These systems may be, for example, display systems.

BACKGROUND

There are different physical principles enabling the contactless locating of a mobile object in space. One of the systems commonly in use involves an electromagnetic emitter placed in a known fixed point emitting electromagnetic fields of known distribution in different directions, these fields being detected by an electromagnetic sensor placed on the mobile object. These fields can be used to determine the position of the object in relation to the emitter. The invention is intended to improve a device emitting electromagnetic fields in precise directions in relation to a reference system X, Y and Z.

Conventionally, electromagnetic fields are emitted by controlling an alternating current at a given frequency in a winding using a closed loop. In all implementations, the complete coil has three windings, one for each geometric axis X, Y and Z. Each winding comprises two half-windings, the terminal voltage of the entire winding being symmetrical with respect to ground, in order to minimize the electric field emitted. The problem of power supply and electrical control of the coils is not so simple.

FIG. 1 shows the principle of the first known implementations of electrical control along an emission axis, the amplification for each axis being differential. On this and the following figures, the conventions concerning representation of electronic components and functions have been used.

If a class AB linear amplifier 2 is used, the resonance effect is normally used to limit the draw of the device. This resonance ensures that the terminal voltage of the half-windings 1 can be much higher than the power supply voltage VP of the amplifier. To emit on the three axes X, Y and Z, the electronic control device comprises three electronic assemblies identical to the one in FIG. 1. In the assembly in FIG. 1, the higher the quality factor of the tuned circuit rises, the greater the voltage gain becomes. However, in this case, selectivity is increased. As dispersion and drift in the different components needs to be taken into account, a compromise is required. A quality factor of about 5 to 10 may be appropriate. Tuning is effected for a given emission frequency. To change the frequency, the value of certain components must be changed to centre the resonance on this new frequency, which creates a first difficulty. Another significant technical difficulty relates to coupling between the axes. Even if the geometry of the winding is optimized, undesirable couplings persist, primarily a mutual inductance between the windings of different—theoretically orthogonal—axes.

The circuit diagram in FIG. 1 suggests that the current in each axis, being closed-loop controlled by an amplifier as a result of the use of a high loop gain, can be forced to be the exact image of the setpoint excitation. In reality, this solution is not possible. An open-loop gain greater than $10^3$ would be required at the emission frequency. To satisfy the stability conditions of the loop, the bandwidth thereof would be very high, reaching tens of MHz. Consequently, the amplifier would require a gain-bandwidth product of several tens of GHz. Even in the case of a gain-bandwidth product and not a bandwidth, it cannot be implemented, because the device would become much too sensitive to internal external disturbances related to the parasitic elements of the winding, the cabling to connect the amplifier to the coil, and thermal noises of the electronic components.

To address the coupling problems, the patent FR 2 685 491 discloses an emitter control system that only emits on a single axis at a time. The device is based on four alternating phases: emission X, then emission Y, then emission Z and finally a self-calibration phase. When emitting on one axis, the circuits of the windings of the two other axes are forced open. Consequently, no mutual-inductance currents can pass through these windings. A schematic diagram of the existing device is shown in FIG. 2. As shown on this figure, the open or closed position of the switches 4 enables a single winding to be powered. Advantageously, this device takes advantage of the use of transformers 3. Consequently, a single amplifier 2 is used. The power supply symmetry of the windings 1 is provided by the secondary of the transformers. The winding circuits are opened using MOSFETs used on switches 4, the crosstalk between axes being minimized by short-circuiting the transformers using switches 5. The voltage to be applied to each coil can be optimized by adjusting the transformation ratios. However, the existing device becomes more complex once the emission frequency needs to be switched. This requires the addition of electromagnetic relays to switch the windings on the transformers. In short, the drawbacks of this device are:

Inability to program a specific frequency from a large number of possible choices;

Alternating emission, one axis after the other, which reduces the integration time for the measurement;

Volume of the emission electronics on account of the transformers and relays used.

A solution for eliminating tuned-resonance amplification and obviating the need for large transformers is to use chopper-stabilized amplifiers. The use of three differential PWM amplifiers is not less efficient in terms of volume than the existing solution. However, building low-crosstalk switches using MOSFETs to interrupt the current in windings is theoretically very complex. The problem of emission frequency flexibility is resolved, but this requires continuing to emit alternately, on just one axis at a time.

SUMMARY OF THE INVENTION

Since the direct wideband amplification solution with very high negative feedback is not realistic, the device according to this invention uses a digital compensation technique to eliminate the effects of couplings between the axes.

More specifically, the invention concerns an electromagnetic emission device for a helmet position detection system comprising an electromagnetic emitter and control electronics, the emitter comprising three windings arranged perpendicularly, and the processing electronics comprising three electronic chains of similar structure, each electronic chain being associated with a given winding and generating an electronic supply signal of said winding, the electronic chains emitting simultaneously, characterized in that each electronic chain comprises closed-loop control means arranged such that the related signal generated comprises three analogue components: a first component, referred to as the stimulus component, modulated at an emission frequency of the winding associated to said electronic chain, each of the three emission frequencies being different from one winding to the next, and a second and a third component, referred to as correction components, each of these two components being modulated at an emission frequency of another winding, the phase and amplitude of which are calculated such as to compensate the parasitic signals received by said winding from the other two windings; such that each winding in steady-state only emits electromagnetic radiation at its own emission frequency and at a predetermined phase and intensity.

Advantageously, each electronic chain comprises three main assemblies: a first closed-loop control assembly generating three digital emission components, the first digital "stimulus" emission component corresponding to the first analogue "stimulus" component, the second digital "correction" emission component corresponding to the second analogue "correction" component, and the third digital "correction" emission component corresponding to the third analogue "correction" component; a second shaping assembly providing for the digital-analogue conversion of the digital components into analogue components, the mixing and shaping of said analogue components such as to obtain the electronic supply signal of the winding; a third measurement assembly providing for the measurement of the signal emitted by the winding, the analogue-digital conversion of the signal emitted and the demodulation thereof into three components, each component being at one of the three emission frequencies, a first "stimulus" measured component at the emission frequency of the winding, a second "correction" measured component at the emission frequency of a second winding and a third "correction" measured component at the emission frequency of the third winding.

Advantageously, each first closed-loop control assembly comprises three substantially identical closed-loop control subassemblies, the first "stimulus" subassembly generating the first digital "stimulus" emission component from the first "stimulus" measured component; the second subassembly generating the second digital "correction" emission component from the second "correction" measured component; and the third subassembly generating the third digital "correction" emission component from the third "correction" measured component.

Advantageously, each "stimulus" closed-loop control subassembly comprises the following three main electronic units:

An "angular zone" unit that defines the angular zones in the Fresnel plane of the real and imaginary parts of the "stimulus" emission component;

A "module and phase correction" unit that calculates, depending on the angular zone in which the "stimulus" emission component is located, the basic "set" corrections of the real and imaginary parts, a basic "set" correction being a correction that can only assume a limited number of values;

A "decision" unit that, depending on the real and imaginary parts of the digital "stimulus" measured component and the basic corrections, delivers the type and sign of the actions to be performed on the module and the phase of the "stimulus" emission component, such as to reduce the gap between the "stimulus" measured component and a "stimulus" reference component.

Advantageously, each "correction" closed-loop control subassembly comprises the following three main electronic units:

An "angular zone" unit that defines the angular zones in the Fresnel plane of the real and imaginary parts of the "correction" emission component;

A "module and phase correction" unit that calculates, depending on the angular zone in which the "correction" emission component is located, the basic "set" corrections of the real and imaginary parts, a basic "set" correction being a correction that can only assume a limited number of values;

A "decision" unit that, depending on the real and imaginary parts of the digital "correction" measured component and the basic corrections, delivers the type and sign of the actions to be performed:
  on the "correction" emission component, such as to cancel the "correction" measured component,
  on the phase of the "correction" emission component, in the absence of any correction component, the terminals of the phase of the parasitic signal emitted at the same frequency as said component being predetermined by calculation or measurement.

Advantageously, there are eight angular zones and they split the Fresnel plane into eight zones of equal size, inside a zone, a component belonging to a zone as a function of the following three criteria: sign of the real part of said component, sign of the imaginary part of said component, sign of the difference of the absolute values of the real and imaginary parts of said component.

Advantageously, the "decision" unit corrects, as a function of the real and imaginary parts of the digital measured component and the basic corrections, either only the module or only the phase of the emission component.

BRIEF DESCRIPTION OF THE DRAWINGS

The invention and additional advantages thereof can be better understood from the non-limiting description given below, with reference to the attached figures, in which.

DETAILED DESCRIPTION

The emission device according to the invention is designed for electromagnetic helmet position detection systems. It comprises an electromagnetic emitter and control electronics.

The emitter is conventional. It comprises three windings arranged perpendicularly. The processing electronics essentially comprise three electronic chains of similar structure, each electronic chain being associated with a given winding and generating an electronic supply signal of said winding, the electronic chains operating simultaneously. To emit simultaneously on all three axes, three different emission frequencies are used, which are marked F1, F2 and F3 in the description, each frequency being attributed to an emission chain.

To address the problems of inter-winding coupling, each electronic chain comprises closed-loop control means arranged such that the related signal generated comprises three analogue components: a first component, referred to as the stimulus component, modulated at the emission frequency of the winding associated to said electronic chain, and a second and a third component, referred to as correction components, each of these two components being modulated at an emission frequency of another winding, the phase and amplitude of which are calculated such as to compensate the parasitic signals received by said winding from the other two windings; such that each winding in steady-state only emits electromagnetic radiation at its own emission frequency and at a predetermined phase and intensity.

Figure 1:
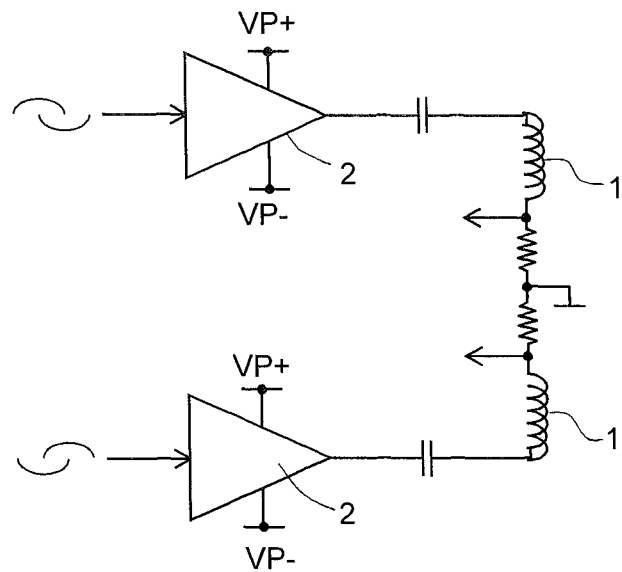
FIG. 1, as already mentioned, shows an electric control circuit for a winding on an emission axis according to the prior art.
Figure 2:
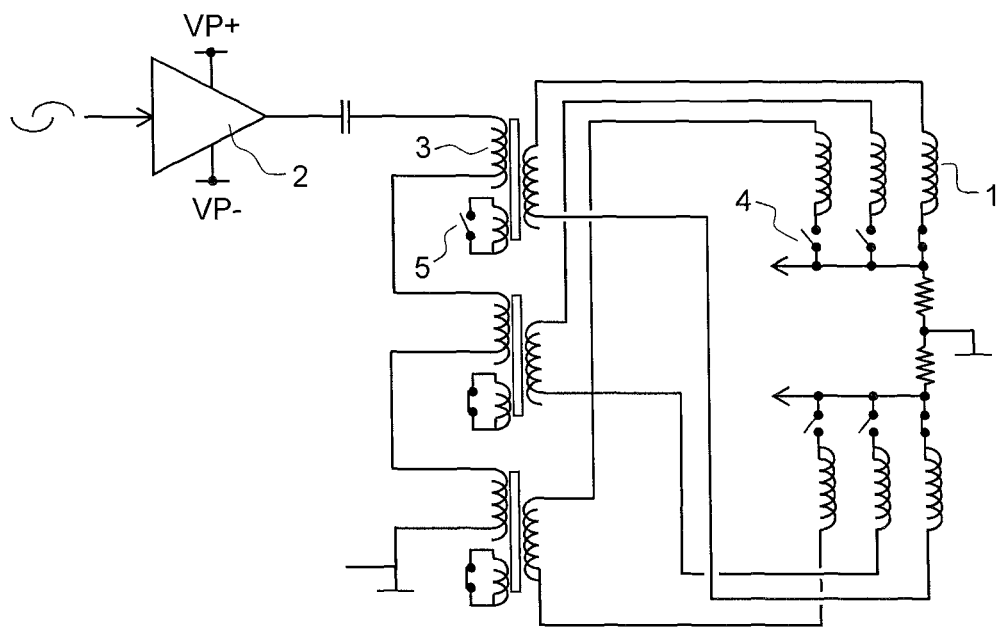
FIG. 2, as already mentioned, shows an electric control circuit for three windings on three emission axes according to the prior art.
Figure 3:
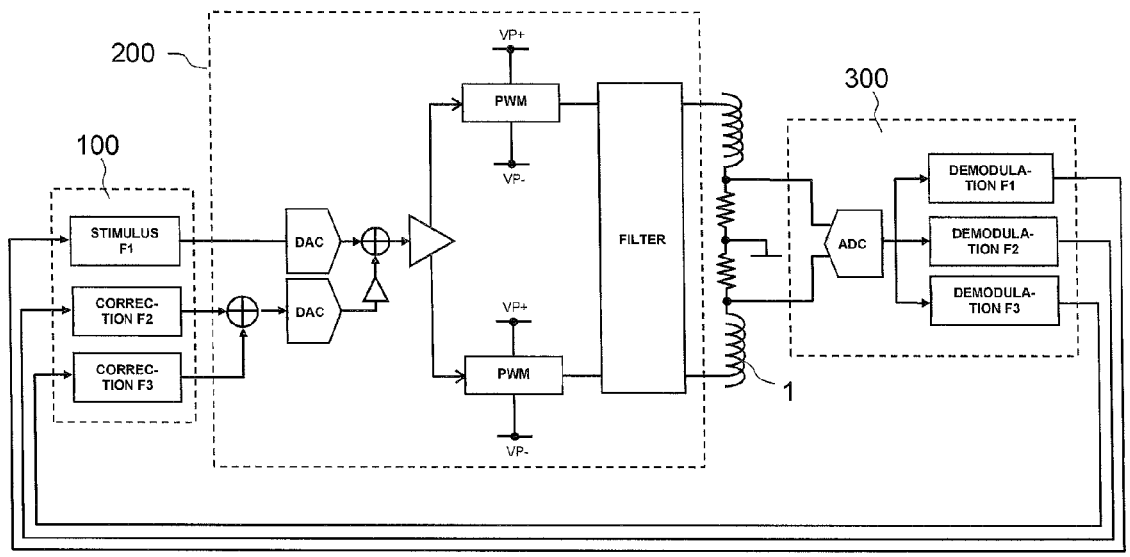
FIG. 3 shows the circuit of an electronic control chain of a winding excluding closed-loop control assemblies.

The schematic diagram of an electronic control chain of a winding with closed-loop control assemblies is shown in FIG. 3. In the case shown in FIG. 3, the frequency emitted on the axis in question is F1. Consequently, the emission component is at the frequency F1 and the correction components at the frequencies F2 and F3. It essentially comprises three main assemblies: a first closed-loop control assembly 100 generating the three digital emission components, a first component, referred to as the stimulus component, modulated at the emission frequency of the winding associated to said electronic chain, and second and third components, referred to as the correction components, modulated at two other frequencies; a second shaping unit 200, comprising digital-analogue converters (DAC), providing for the digital-analogue conversion of the digital components into analogue components, the mixing and shaping of said analogue components such as to obtain the electronic supply signal of the winding. In FIG. 3, conversion is provided using two DAC converters. A single DAC per axis could be used, provided it has sufficient resolution; a third measurement unit 300 providing for the measurement of the signal emitted by the winding, the analogue-digital conversion of the signal emitted and the demodulation thereof into three components, each component being at one of the three emission frequencies F1, F2 and F3, a first "stimulus" measured component at the emission frequency of the winding, a second "correction" measured component at the emission frequency of a second winding and a third "correction" measured component at the emission frequency of the third winding.

Two types of difficulties are encountered when creating the closed-loop control assemblies:

Complex implementation, since the objective is to minimize the volume of the electronics, not to increase it;

Generating the correct amplitude and the correct phase of a compensation signal, i.e. calculating two variables, since the phase setpoint is indeterminate for the correction components.

It should be noted that the overview in FIG. 3 and the related compensation principle do not necessarily apply to PWM or class D chopper-stabilized amplifiers. The same solution may be used with other types of amplifiers, notably class AB amplifiers. In the case of tuned amplifiers, the benefit of frequency flexibility is lost. It should also be noted that the same compensation solutions may be used for alternating emissions, i.e. one emission axis followed by another, which obviates the need to interrupt the current in the windings.

There are several options for generating the "stimulus" emission signal. In this case, the amplitude and the phase of the signal sought are perfectly determined.

Figure 4:
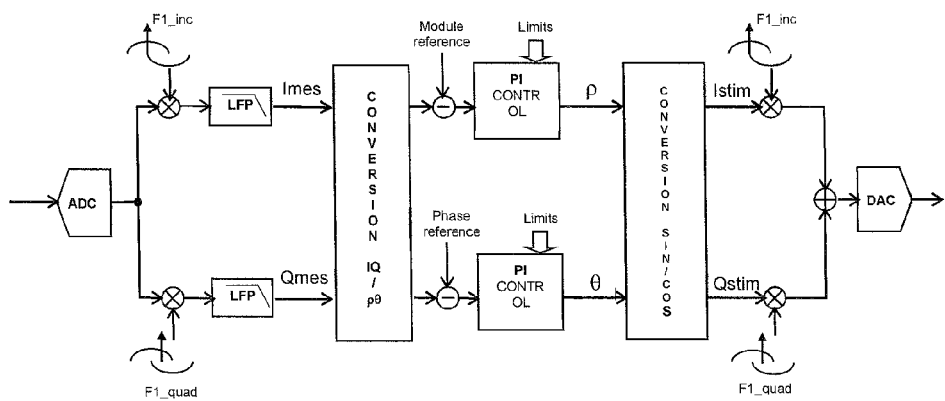
FIG. 4 shows a first embodiment of the closed-loop control subassembly of the "stimulus" component of an electronic control chain according to the invention.

In the absence of any size or power draw restrictions, and if calculating means obtaining notably all of the trigonometric functions are available, the solution for generating the stimuli is relatively simple. A sample embodiment is shown in FIG. 4. Depending on the phase error and the module error, the phase and the module of the excitation signal are corrected using proportional-integral control. The proportional action is chosen to create a zero that compensates the pole corresponding to the low-pass filter of the synchronous demodulation. Two trigonometric conversions are then necessary to pass the real and imaginary parts of the signal measured to the phase and module information, or $XY \rightarrow \rho\theta$ conversions, or vice versa. The difficulty lies in that these conversions require a "dynamic calculation", as it is performed for each new measurement sample, unlike a "static calculation", which is only performed when powering up or changing configuration. "Static calculations" that are performed infrequently may be performed by a central processor, the data being recovered in the registers via a digital link.

The objective is to find an electronic solution that is easy to integrate into a very small field-programmable gate array (FPGA) programmable circuit, preferably with non-volatile memory using flash PROM technology unaffected by single event upsets (SEU). This circuit may be, for example, an IGLOO-brand FPGA marketed by ACTEL. The "dynamic calculations" are performed at a frequency of several MHz. As the clock rate of the FPGA may range from several tens of MHz to around 100 MHz, the calculations are performed sequentially using several tens of clock periods each time. Multiplications, divisions and other similar functions are then performed by combinations of successive additions or subtractions. It is then possible to create the electronics in FIG. 4, performing the trigonometric functions using the coordinate rotation digital computer (CORDIC) algorithm or polynomial approximations.

However, this solution cannot be used to generate the correction components. Indeed, the diagram in FIG. 4 is completely unusable in the case of closed-loop control to compensate the coupling components because, if the value of the module is known and is zero, the phase thereof is indeterminate. In the absence of additional information, the closed-loop control corresponding to the circuit diagram in FIG. 4 cannot determine the correct phase and the module of the compensation signals.

The basic purpose of the emission device according to the invention is to provide a simpler electronic solution generating both the emission signal and, more importantly, the compensation or correction signals. Naturally, the core of the invention is the closed-loop control assembly. The closed-loop control according to the invention is based on three principles:

The direction of variation of the phase and of the module of an emission or correction component is determined as a function of the result of the comparison of the related measured component with the related setpoint component;

The theoretical phase of the emission and correction components is known approximately;

The sign of the increments of the phase and of the module of an emission or correction component depends on the phase of said measured component.

Each closed-loop control assembly 100 therefore comprises three substantially identical closed-loop control subassemblies 110, the first dedicated to the excitation or stimulus component, and the second and third dedicated to the correction components. Each closed-loop control subassembly comprises logical circuits split primarily between the following three main electronic units:

An "angular zone" unit 120 that defines the angular zones in the Fresnel plane of the real and imaginary parts of the "stimulus" or "correction" emission components. This unit is the same for the different closed-loop control subassemblies;

A "module and phase correction" unit 130 that calculates, depending on the angular zone in which the "stimulus" or "correction" emission component is located, the basic "set" corrections of the real and imaginary parts, a basic "set" correction being a correction that can only assume a limited number of values. This unit is the same for the different closed-loop control subassemblies;

A "decision" unit 140 the functions of which differ depending on the component to be corrected:

depending on the real and imaginary parts of the digital "stimulus" measured component and the basic corrections, this unit delivers the type and sign of the actions to be performed on the module and the phase of the "stimulus" emission component, such as to reduce the gap between the "stimulus" measured component and a "stimulus" reference component;

depending on the real and imaginary parts of the digital "correction" measured component and the basic corrections, it delivers the type and sign of the actions to be performed on the module of the "correction" emission component, such as to cancel the measured "correction" component, and on the phase of the "correction" emission component, in the absence of any correction component, the terminals of the phase of the parasitic signal emitted at the same frequency as said component being predetermined by calculation or measurement.

Each of these operations may be performed using very simple logic functions. The only slightly complex "dynamic" mathematical functions are multiplications. These are effected sequentially. The other "dynamic" functions are basic functions, primarily additions and comparisons. The following notations are used in the remainder of the description and in the figures:

The components of the real and imaginary parts of the measured components are marked Imes and Qmes (I for Incidence and Q for Quadrature);

The components of the real and imaginary parts of the reference components are marked Iref and Qref;

The components of the real and imaginary parts of the emission components are marked Istim and Qstim;

The corrections to be applied to the components are marked $\Delta i$ and $\Delta q$.

Figure 5:
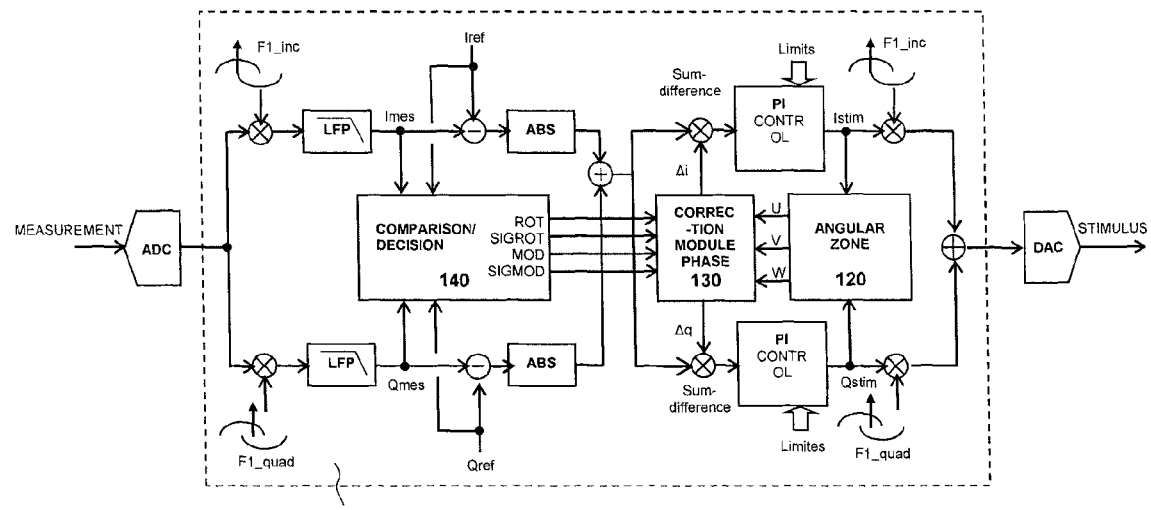
FIG. 5 shows a second embodiment of one of the closed-loop control subassemblies of an electronic control chain according to the invention.

An overview of the closed-loop control assemblies is given in FIG. 5. The corrections $\Delta i$ and $\Delta q$ upstream of the proportional-integral controllers for Istim and Qstim are weighted by the "sum-difference" signal, which is the sum of the absolute-value errors in Imes and Qmes. Thus, when the target is reached, the correction signal of the proportional-integral (PI) controllers is cancelled. The digital sinusoidal signals Fx_inc and Fx_quad may be generated using a generator with two looped and stabilized wired integrators, or a polynomial sine and cosine equation. In the case of a polynomial solution, as it is a signal evolving progressively over time, squared, cubed and other functions are generated with simple integrators, which obviates the need to use multipliers.

Details of the electronic units are given below. Naturally, it is an example embodiment the details of which may be adapted or varied without losing the general principles of closed-loop control based on three functional units implemented with basic logic functions. However, it is an excellent technical compromise in terms of complexity and performance.

"Angular Zone" Unit

This defines the angular zones or quadrant in the Fresnel plane (i, q) of the real and imaginary parts of the "stimulus" or "correction" emission components. This unit is the same for the different closed-loop control subassemblies. Simulations of the device demonstrate that a definition into eight zones is amply sufficient. This definition is very useful as it only requires three simple comparisons to define the quadrant to which a component belongs. These comparisons are as follows:

$i\text{stim} \geq 0 - q\text{stim} \geq 0 - \text{ABS}(q\text{stim}) \geq \text{ABS}(i\text{stim})$ with the convention: ABS=absolute value.

In this case, the "angular zone" unit outputs an output signal encoded over 3 bits marked u, v and w having the following values:

$u = \text{sign}(i\text{stim})$ $v = \text{sign}(q\text{stim})$ $w = \text{sign}[\text{ABS}(i\text{stim}) - \text{ABS}(q\text{stim})]$ The two's complement sign convention is used for signed signals, i.e. the sign is 0 when the variable is positive or null and the sign is 1 when the variable is negative.

Figure 6:
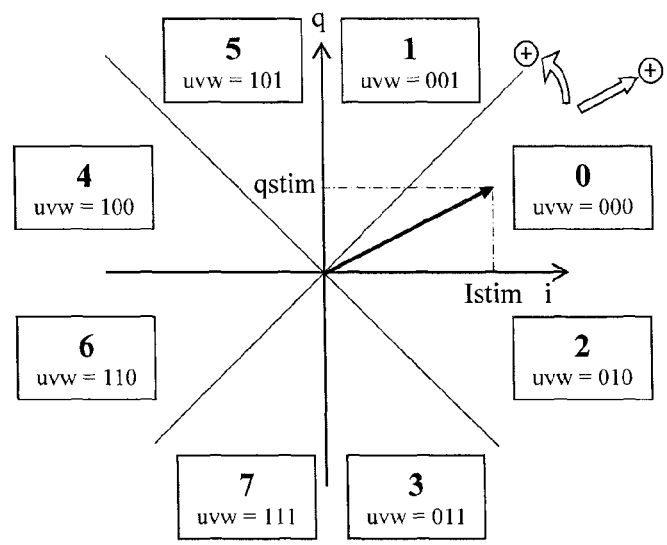
FIG. 6 shows the angular zones in the Fresnel plane of the "angular zone" unit of the closed-loop control subassemblies.

These eight quadrants are shown in the Fresnel plane (i, q) in FIG. 6. Naturally, this eight-quadrant division is retained in the remainder of the description. In FIG. 6, the quadrants are numbered 0 to 7 as a function of the value of the triple (u, v, w).

"Correction" Unit

The "module and phase correction" unit calculates, depending on the angular zone in which the "stimulus" or "correction" emission component is located, the basic "set" corrections of the real and imaginary parts, a basic "set" correction being a correction that can only assume a limited number of values. This unit is the same for the different closed-loop control subassemblies. Depending on the angular zone in which the phase of the excitation signal is located, for a given correction, for example a counterclockwise rotation, the sign of the increments will change. For example, in zone 0, the increment $\Delta q$ is positive while it is negative in zone 4.

Ideally, rotation ought to be orthogonal to the vector [istim, qstim] and the module increase co-linear. FIG. 6 shows that this is feasible provided that the ratio $\Delta ir/\Delta qr$ is the same as qstim/istim. This requires a dynamic division, which is not impossible, but which complicates the calculations. However, simulation of the device demonstrates that this can be greatly simplified, i.e. that set corrections are sufficient for each zone, without calculating the ratio qstim/istim or the inverse thereof. This achieves the appropriate correction by successive approximations.

Figure 7:
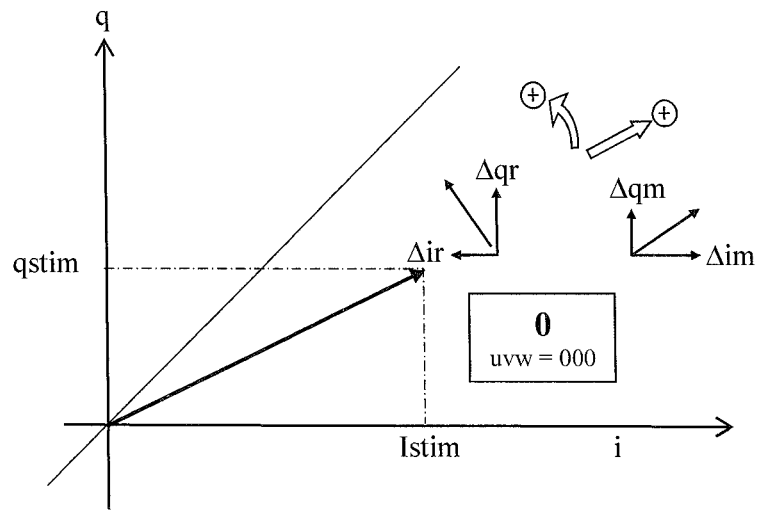
FIG. 7 shows the basic corrections in a specific zone of the "angular zone" unit.

By way of example, FIG. 7 shows the corrections in zone 0. An anticlockwise correction of the rotation of the phase is marked "rotation ⊕" and a correction of the rotation of the phase in the opposite direction is marked "rotation ⊖". A correction tending to increase the module is also marked "module ⊕" and a correction tending to decrease the module is marked "module ⊖". The corresponding basic corrections to be made to the real and imaginary parts of the component are as follows:

rotation ⊕ ⇒ $\Delta ir=-1$ and $\Delta qr=+2$ rotation ⊖ ⇒ $\Delta ir=+1$ and $\Delta qr=-2$ module ⊕ ⇒ $\Delta im=+2$ and $\Delta qm=+1$ module ⊖ ⇒ $\Delta im=-2$ and $\Delta qm=-1$ If there is simultaneous rotation and variation of the module, the corrections to be made are combined. The result is as follows:

$\Delta i=\Delta ir+\Delta im$ $\Delta q=\Delta qr+\Delta qm$

Table I below relates to the different zones and the "rotation ⊕" and "modulation ⊕" corrections:

TABLE I

| | | | Rotation ⊕ | | Module ⊕ | |
|---|---|---|---|---|---|---|
| u | v | w | $\Delta ir$ | $\Delta qr$ | $\Delta im$ | $\Delta qm$ |
| 0 | 0 | 0 | −1 | 2 | 2 | 1 |
| 0 | 0 | 1 | −2 | 1 | 1 | 2 |
| 1 | 0 | 1 | −2 | −1 | −1 | 2 |
| 1 | 0 | 0 | −1 | −2 | −2 | 1 |
| 1 | 1 | 0 | 1 | −2 | −2 | −1 |
| 1 | 1 | 1 | 2 | −1 | −1 | −2 |
| 0 | 1 | 1 | 2 | 1 | 1 | −2 |
| 0 | 1 | 0 | 1 | 2 | 2 | −1 |

The following correspondences may be established:

Rotation ⊕ corresponds to SIGROT=0

Module ⊕ corresponds to SIGMOD=0.

To standardize the increment calculation, the following is written:

If ROT=0 then $\Delta ir=\Delta qr=0$

If MOD=0 then $\Delta im=\Delta qm=0$

If SIGROT=1 then $\Delta ir$ and $\Delta qr$ invert

If SIGMOD=1 then $\Delta im$ and $\Delta qm$ invert

Finally, to obtain the full increment, the rotation increments are combined with the module variation increments:

$\Delta i=\Delta ir+\Delta im$ and $\Delta q=\Delta qr+\Delta qm$.

The output signals of the correction unit are coded over 3 two's complement bits, i.e. $\Delta i[2:0]$ and $\Delta q[2:0]$. The Boolean equations are as follows:

$\Delta ir[2]=[\text{non}(v)*\text{non}(\text{SIGROT})+v*\text{SIGROT}]*\text{ROT}$ $\Delta ir[1]=[w+\text{non}(v)*\text{non}(\text{SIGROT})+v*\text{SIGROT}]*\text{ROT}$ $\Delta ir[0]=\text{non}(w)*\text{ROT}$ $\Delta qr[2]=[u*\text{non}(\text{SIGROT})+\text{non}(u)\text{SIGROT}]*\text{ROT}$ $\Delta qr[1]=[\text{non}(w)+u*\text{non}(\text{SIGROT})+\text{non}(u)*\text{SIGROT}]*\text{ROT}$ $\Delta qr[0]=w*\text{ROT}$ $\Delta im[2]=[u*\text{non}(\text{SIGMOD})+\text{non}(u)*\text{SIGMOD}]*\text{MOD}$ $\Delta im[1]=[\text{non}(w)+u*\text{non}(\text{SIGMOD})+\text{non}(u)\text{SIGMOD}]*\text{MOD}$ $\Delta im[0]=w*\text{MOD}$ $\Delta qm[2]=[v*\text{non}(\text{SIGMOD})+\text{non}(v)*\text{SIGMOD}]*\text{MOD}$ $\Delta qm[1]=[w+v*\text{non}(\text{SIGMOD})+\text{non}(v)*\text{SIGMOD}]*\text{MOD}$ $\Delta qm[0]=\text{non}(w)*\text{MOD}$ "Decision" Unit-"Stimulus" Component A "decision" unit that, depending on the real and imaginary parts of the digital "stimulus" measured component and the basic corrections, delivers the type and sign of the actions to be performed on the module and the phase of the "stimulus" emission component. In general, iref positive and qref null are chosen.

The objective is to avoid calculating the ROOT module (imes2+qmes$^2$). It is possible to avoid this calculation by adopting simple rules either to correct the module or the phase of the "stimulus" emission component.

Figure 8:
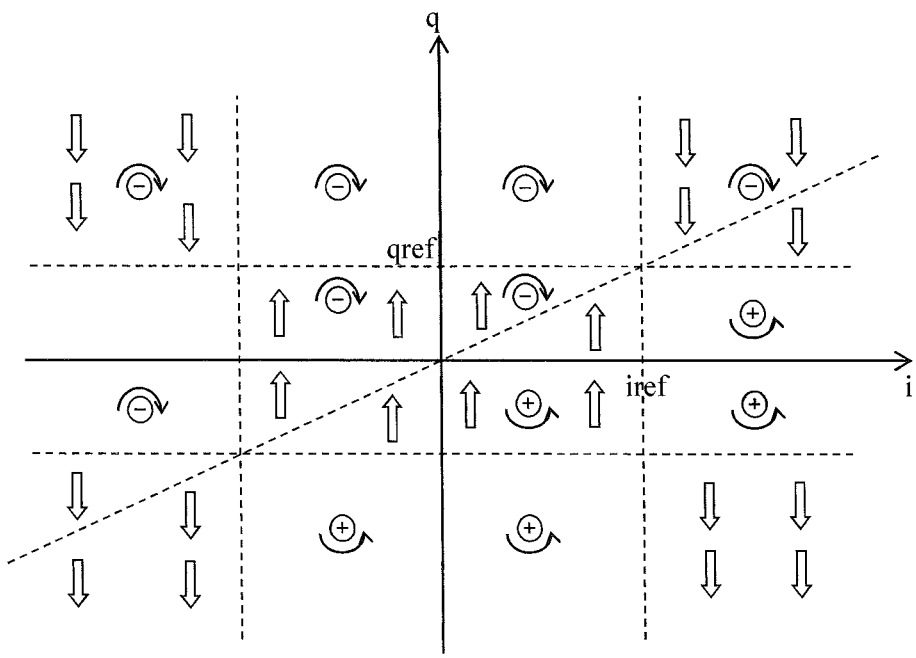
FIG. 8 shows the correction principle applied to the "stimulus" emission component in the Fresnel plane, of the "decision" unit.

In the example embodiment shown in FIG. 8, the following rules have been adopted:

If ABS(imes)<ABS(iref) AND ABS(qmes)< ABS(qref), then module increase;

If ABS(imes)≥ABS(iref) AND ABS(qmes)≥ ABS(qref), then module decrease.

In FIG. 8, the increases or decreases of the module are marked by vertical straight arrows and the increases or decreases in the phase are marked by circled "+" and "−" signs.

In the two other cases, it is not possible to determine the correction to be made to the module, but—conversely—the direction of phase rotation is known. To improve convergence speed, a slightly more complicated calculation is then used, employing two dynamic multiplications.

Figure 9:
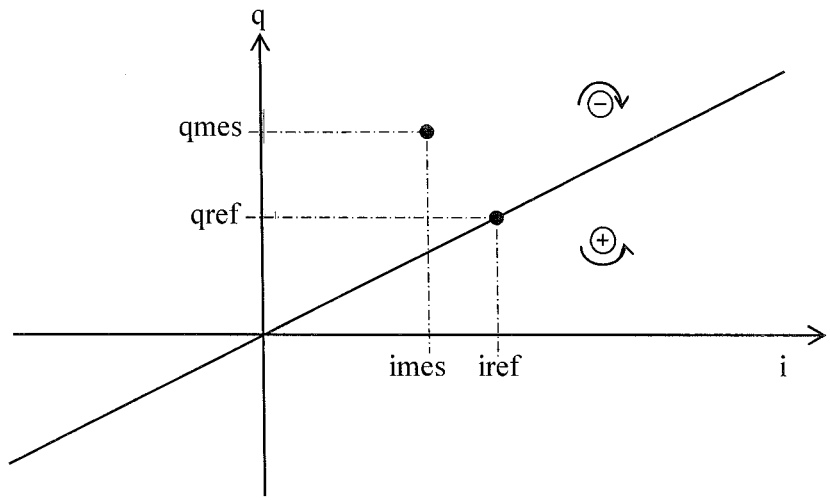
FIG. 9 shows the correction principle applied to the phase of the "stimulus" emission component in the Fresnel plane, of the "decision" unit.

The principle is explained in FIG. 9. For all of the points located above the straight line passing through [iref, qref], the rotation is clockwise (SIGROT=1). For the other points, SIGROT=0. When the points are on the straight line, then ROT=0 and SIGROT is irrelevant.

The unit equations can be summarized as follows:

SIGROT=SIGN(qref*imes−iref*qmes)

If (qref*imes−iref*qmes)=0 then ROT=0 else it is 1.

IF ABS(imes)<ABS(iref) AND ABS(qmes)< ABS(qref) ⇒ MOD=1 and SIGMOD=0

IF ABS(imes)≥ABS(iref) AND ABS(qmes)≥ ABS(qref) ⇒ MOD=1 and SIGMOD=1.

"Decision" Unit-"Correction" Component

It is now the case that the setpoint verifies qref=iref=0. The phase setpoint is then totally indeterminate. To resolve this indetermination, the orders of magnitude of the phase differences in the device are calculated, which reveals the approximate phase of the coupling to be compensated and the phase of the compensation excitation signal. Another possible solution is to take a measurement in the absence of compensation in order to determine the phase of the coupling.

Figure 10:
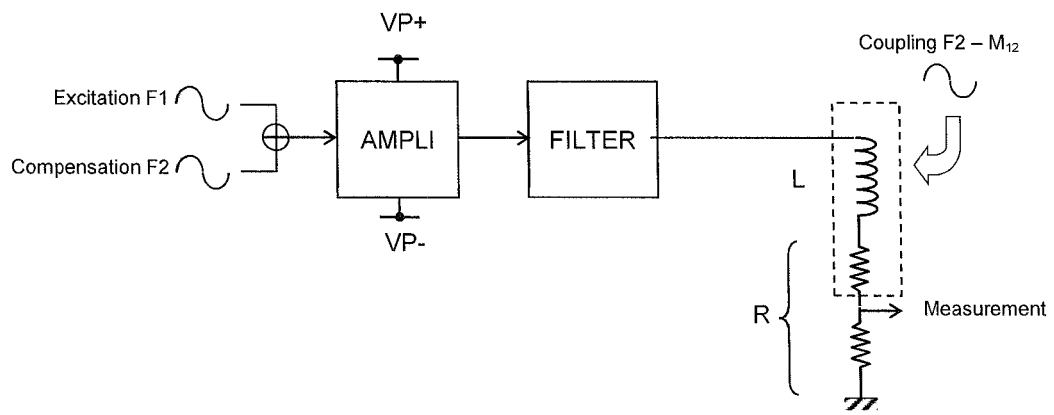
FIGS. 10 and 11 give an electronic overview of the coupling of one winding to another.

For the sake of simplification, only the coupling of a second winding operating at frequency F2 on a first winding operating at frequency F1 is cancelled, knowing that the procedure is absolutely identical to eliminate the coupling at frequency F3 coming from the third winding axis. In this context, the electronic system for which the phase differences are to be calculated is shown in FIG. 10.

Figure 11:
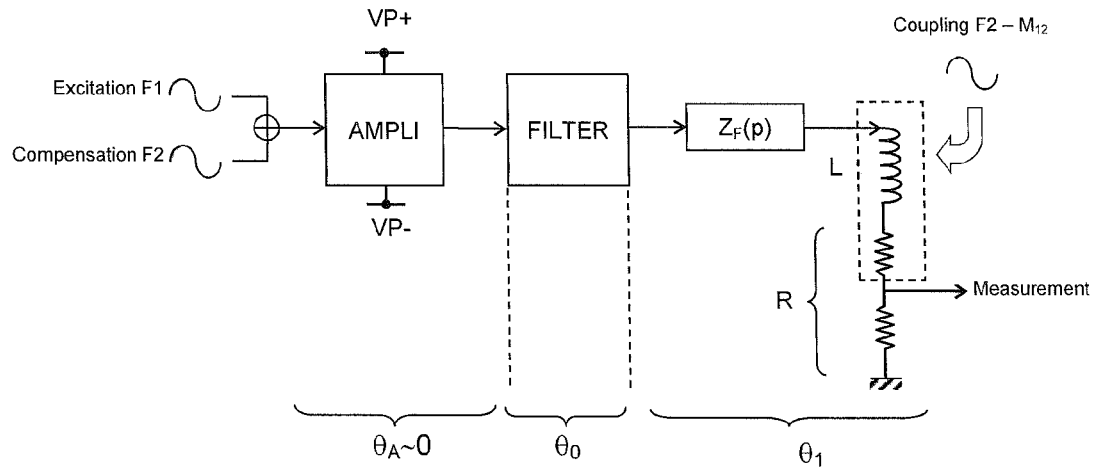

As the coupling is primarily inductive, by mutual inductance between axes, the nominal values of the phases can be calculated with sufficient accuracy, as the device is tolerant. The coupling coefficient of the second winding on the first winding is called $M_{12}$. The phase difference of the amplifier $\theta_A$ is normally negligible in relation to the phase difference $\theta_0$ of the filter and the phase difference $\theta_1$ of the winding. We can move from the diagram in FIG. 10 to the diagram in FIG. 11 by applying Thévenin's and Norton's theorem.

Calculating the current $I_{12}$ at the frequency F2 passing through the first winding results in the following:

$$I_{12}=U_{12}/(R+Lp+Z_F(p))-M_{12}*p*I_{22}/(R+Lp+Z_F(p)).$$

In the absence of a compensation device, the coupling term is as follows:

$$\text{Coupling}=-M_{12}*p*I_{22}/(R+Lp+Z_F(p)).$$

Figure 12:
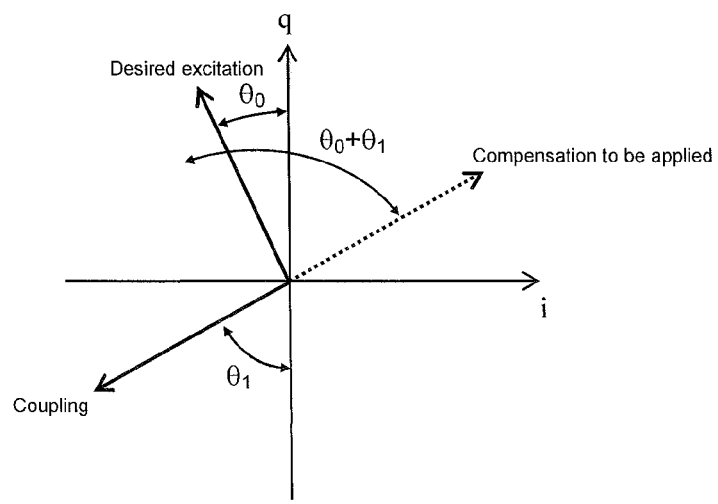
FIG. 12 shows, in the Fresnel plane, the different components of the signal emitted by a winding.

FIG. 12 shows a Fresnel diagram showing the phase of the different signals marked "Desired excitation", "Coupling" and "Compensation to be applied". By definition, the emission of the stimuli is deemed to be on the axis of the incidences (i). It is observed that:

The phase of the excitation signal to be generated is ($\theta_0$+90°), phase difference of the no-load filter;

The phase of the coupling to be compensated is $-(\theta_1+90°)$. The phases $\theta_0$ and $\theta_1$ are dependent on the frequency chosen.

Figure 13:
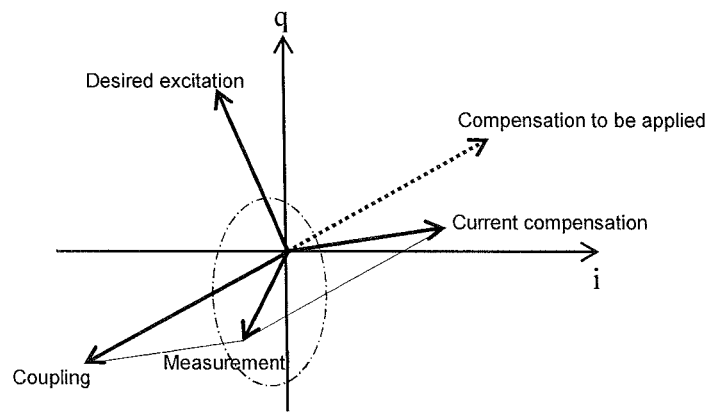
FIGS. 13 and 14 show, in the Fresnel plane, the simplified closed-loop control principle of the "correction" components of the signal emitted by a winding.

In order to facilitate understanding of the device, FIG. 13 shows a simplified solution. In the case shown, the corrections MOD and ROT are only dependent on the quadrant to which the measured vector [imes, qmes] belongs. Thus, in the quadrant [i>0, q>0], the module must decrease, in the quadrant [i>0, q<0], the phase must turn counterclockwise, in the quadrant [i<0, q>0], the phase must turn clockwise and finally in the quadrant [i<0, q<0], the module must increase algebraically.

Figure 14:
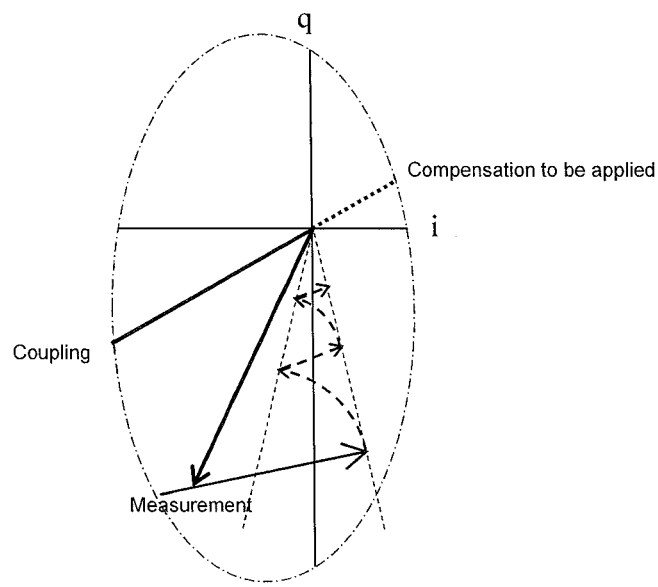

It can be seen that the convergence of the closed-loop control is effected correctly, which is explained in FIG. 14, which shows the convergence of the compensation principle. If the result of the measurement moves from one quadrant to another, amplitude correction (MOD=1) is replaced by rotation correction (ROT=1). As the increments are weighted by the sum of the differences between measurement and setpoint, the overshoots decrease and the vector measured ends up being cancelled, as expected. The succession of dotted-line arrows in FIG. 14 shows how the coupling is reduced as the closed-loop control cycles progress.

Naturally, the device must be compatible with any value of $\theta_1$. The solution is comparable to a change of marker. In other words, the principle of the four quadrants in FIG. 13, which corresponds to the four compensation cases (MOD+, ROT+, MOD−, ROT), is used again, but they are rotated as a function of the value $\theta_1$. Thus, the quadrant in which the module is known to require increasing is centred±45° about the nominal direction of the coupling vector. This provides a good degree of robustness, enabling the dispersion and drift of the components to be disregarded.

Figure 15:
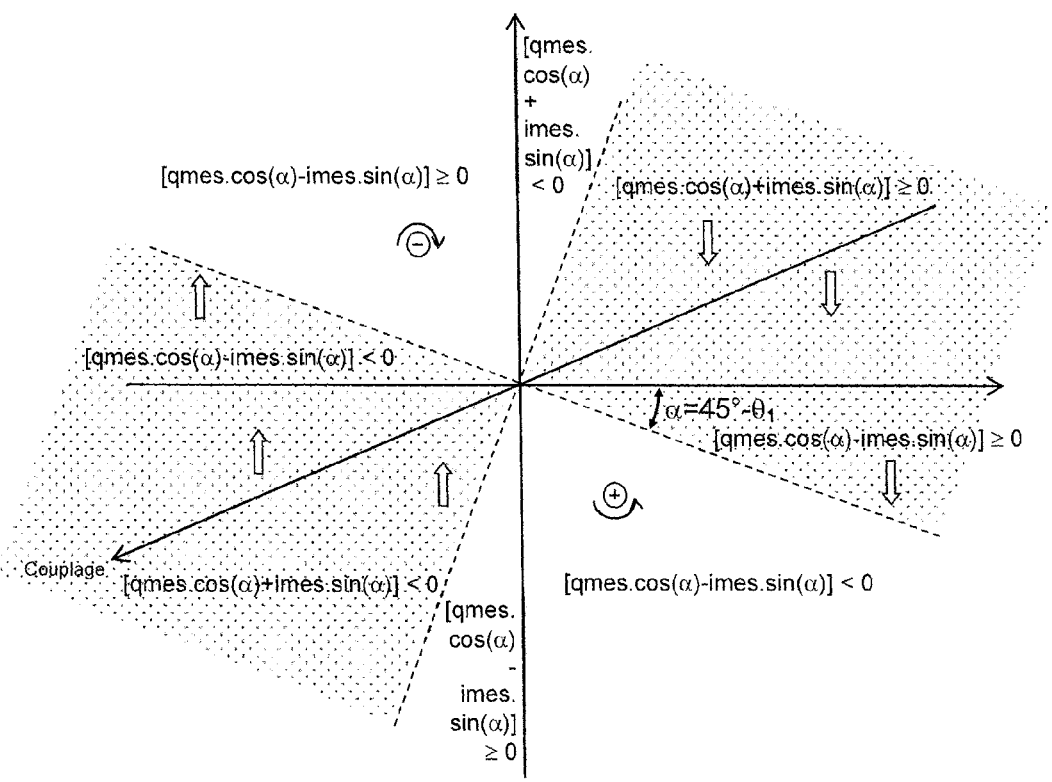
FIG. 15 shows, in the Fresnel plane, the general closed-loop control principle of the "correction" components of the signal emitted by a winding.

By way of example, the solution with the related equations for an angle $\theta_1$ of between 45° and 135° is shown in FIG. 15, which shows the equations of the decision unit for the compensation. The equations in FIG. 15 are only valid if $45° \leq \theta_1 < 135°$, which is usually the case for the mutual inductance sign considered. For other values of $\theta_1$ or an inverse sign mutual inductance, the principle is the same. The equations are algebraic, the value of a being negative for the angles $\theta_1$ considered. Naturally, if imes=qmes=0, the actions MOD and ROT are cancelled, the target having been reached.

The logic equations of the functional unit are as follows:

IF imes=0 AND qmes=0 then no correction to be made so MOD=ROT=0. SIGMOD and SIGROT are immaterial in this case.

Else:

Quadrant imes≥0 and qmes≥0

IF SIGN[imes*cos($\alpha$)+qmes*sin($\alpha$)]=0, then:

MOD=1

SIGMOD=1 (reduce amplitude)

ROT=0

SIGROT=X(immaterial)

Else:

MOD=0

SIGMOD=X(immaterial)

ROT=1

SIGROT=1

Quadrant imes≥0 and qmes<0: same principle

Quadrant imes<0 and qmes≥0: same principle

Quadrant imes<0 and qmes<0: same principle

Only two multiplication functions need to be physically implemented to perform the function: "A*cos($\alpha$)+B*sin($\alpha$)", the values A and B being reassigned depending on the quadrant [imes, qmes].

The overview in FIG. 5 shows that limits may be imposed on the excitation signal, whether this is the emission stimulus or the coupling compensation. Knowing the order of magnitude of the phase $\theta_0$, the phase and the module of the excitation signal may be confined to reasonable limits in consideration of the dispersion and drift of the components. Furthermore, on initialization, the value of the phase of the excitation signal is initialized at ($\theta_0$+90°) in order to ensure that convergence is as rapid as possible.

The values of $\theta_0$, $\theta_1$, sin($\alpha$), cos($\alpha$) are calculated in advance as a function of the frequency values chosen. This means that all of these calculations are performed in advance and the tables filled, for example. A main processor may also perform the operations for each configuration change request and the results are sent to the electromagnetic emitter by a small digital link.

Instead of calculating the phase differences in advance, they can simply be measured during an initialization sequence for each configuration. For example, an emission is effected without compensation and the couplings obtained are measured. This has the advantage of being more accurate than calculated values, notably if the coupling is not primarily the result of mutual inductance or if the sign of this mutual inductance is not sufficiently off centred by construction, i.e. if the sign of the mutual inductance is not known a priori.

When moving between two configurations, a dead time during which this sort of calibration is performed and during which the electromagnetic positional closed-loop control function is no longer provided must be avoided.

To make this method entirely "transparent" to the user, an axis must not be allocated a new frequency that is already in use on another axis.

By adding the appropriate hardware resources, and notably the dynamic reserve on the emitters, this solution enables calibration for the frequencies that will be used with the new configuration.

The primary characteristics of the device according to the invention are as follows:
 No coupling between axes, by generating compensation signals at the frequencies in question;
 Use of basic logic functions in the closed-loop control device based on three functional units;
 Option of using chopper-stabilized amplifiers without tuned circuits at specific emission frequencies;
 Use of a FPGA component to provide digital closed-loop control.

The advantages of the device according to the invention are as follows:
 Flexible emission frequency;
 Use of several simultaneous frequencies for a single axis to improve resistance to disturbances, within a reasonable emission power;
 Simultaneous emission over three axes, which improves latency and integration time;
 Self-calibration of receivers that can also simultaneously be on very close frequencies incorporating those used;
 Volume and weight saving.

The invention claimed is:

1. An electromagnetic emission device for a helmet position detection system, comprising:
 an electromagnetic emitter and control electronics, the emitter comprising three windings arranged perpendicularly, and the processing electronics comprising three electronic chains of similar structure, each electronic chain being associated with a given winding and generating an electronic supply signal of said winding, the electronic chains emitting simultaneously,
 each electronic chain comprising closed-loop control means arranged such that the related signal generated comprises three analogue components, including
  a first component, being a stimulus component, modulated at an "emission" frequency of the winding associated to said electronic assembly, each of the three emission frequencies being different from one winding to the next, and
  a second and a third component, being correction components, each of these two components being modulated at an emission frequency of another winding, the phase and amplitude of which are calculated such as to compensate the parasitic signals received by said winding from the other two windings;
 wherein each winding in steady-state only emits electromagnetic radiation at its own emission frequency and at a predetermined phase and intensity.

2. An electromagnetic emission device according to claim 1, wherein each electronic chain comprises the following three main assemblies:
 a first closed-loop control assembly generating three digital emission components, the first digital "stimulus" emission component corresponding to the first analogue "stimulus" component, the second digital "correction" emission component corresponding to the second analogue "correction" component, and the third digital "correction" emission component corresponding to the third analogue "correction" component;
 a second shaping assembly providing for the digital-analogue conversion of the digital components into analogue components, the mixing and shaping of said analogue components such as to obtain the electronic supply signal of the winding; and
 a third measurement assembly providing for the measurement of the signal emitted by the winding, the analogue-digital conversion of the signal emitted and the demodulation thereof into three components, each component being at one of the three emission frequencies, a first "stimulus" measured component at the emission frequency of the winding, a second "correction" measured component at the emission frequency of a second winding and a third "correction" measured component at the emission frequency of the third winding.

3. An electromagnetic emission device according to claim 2, wherein each first closed-loop control assembly comprises three substantially identical closed-loop control subassemblies, comprising:
 a first "stimulus" subassembly generating the first digital "stimulus" emission component from the first "stimulus" measured component;
 a second subassembly generating the second digital "correction" emission component from the second "correction" measured component; and
 a third subassembly generating the third digital "correction" emission component from the third "correction" measured component.

4. An electromagnetic emission device according to claim 3, wherein each "stimulus" closed-loop control subassembly comprises the following three main electronic units:
 an "angular zone" unit that defines the angular zones in the Fresnel plane of the real and imaginary parts of the "stimulus" emission component;
 a "module and phase correction" unit that calculates, depending on the angular zone in which the "stimulus" emission component is located, the basic "set" corrections of the real and imaginary parts, a basic "set" correction being a correction that can only assume a limited number of values; and
 a "decision" unit that, depending on the real and imaginary parts of the digital "stimulus" measured component and the basic corrections, delivers the type and sign of the actions to be performed on the module and the phase of the "stimulus" emission component, such as to reduce the gap between the "stimulus" measured component and a "stimulus" reference component.

5. An electromagnetic emission device according to claim 3, wherein each "correction" closed-loop control subassembly comprises the following three main electronic units:

an "angular zone" unit that defines the angular zones in the Fresnel plane of the real and imaginary parts of the "correction" emission component;

a "module and phase correction" unit that calculates, depending on the angular zone in which the "correction" emission component is located, the basic "set" corrections of the real and imaginary parts, a basic "set" correction being a correction that can only assume a limited number of values;

a "decision" unit that, depending on the real and imaginary parts of the digital "correction" measured component and the basic corrections, delivers the type and sign of the actions to be performed:

on the "correction" emission component, such as to cancel the "correction" measured component, on the phase of the "correction" emission component, in the absence of any correction component, the terminals of the phase of the parasitic signal emitted at the same frequency as said component being predetermined by calculation or measurement.

6. An electromagnetic emission device according to claim 4, further comprising eight angular zones which split the Fresnel plane into eight zones of equal size, and, inside a zone, a component belonging to a zone as a function of the following three criteria:

sign of the real part of said component,
sign of the imaginary part of said component,
sign of the difference of the absolute values of the real and imaginary parts of said component.

7. An electromagnetic emission device according to claim 4, wherein the "decision" unit corrects, as a function of the real and imaginary parts of the digital measured component and the basic corrections, either only the module or only the phase of the emission component.

8. An electromagnetic emission device according to claim 5, further comprising eight angular zones which split the Fresnel plane into eight zones of equal size, and, inside a zone, a component belonging to a zone as a function of the following three criteria:

sign of the real part of said component,
sign of the imaginary part of said component,
sign of the difference of the absolute values of the real and imaginary parts of said component.

9. An electromagnetic emission device according to claim 5, wherein the "decision" unit corrects, as a function of the real and imaginary parts of the digital measured component and the basic corrections, either only the module or only the phase of the emission component.

* * * * *